Patented Dec. 1, 1936

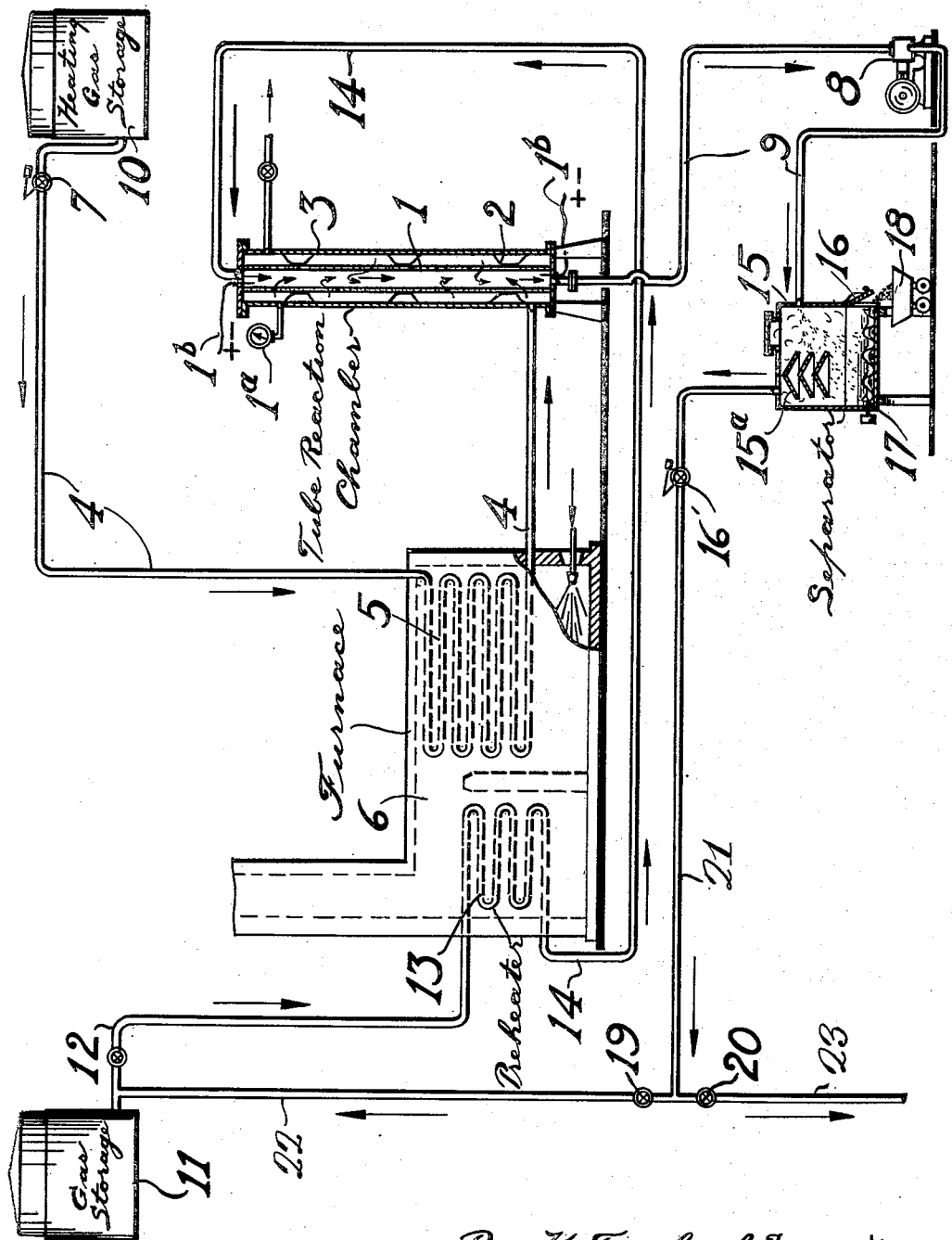

2,062,358

UNITED STATES PATENT OFFICE 2,062,358

CARBON BLACK MANUFACTURE

Per K. Frolich, Roselle, N. J., assignor to Standard Oil Development Company, a corporation of Delaware Application September 21, 1932, Serial No. 634,124

5 Claims. (Cl. 134—60)

This invention relates to the manufacture of carbon black by the decomposition of hydrocarbon gases in the substantial absence of oxygen, under the conditions hereinafter described, and to the carbon black so produced. The gases are decomposed by indirect heat from a surrounding gaseous atmosphere at high temperature. Diffusion of the heating gas into the decomposing gas is permitted in the preferred form of the invention.

A principal object of the invention is to provide a process which will yield carbon black containing a regulated amount of hydrocarbon material adapted to improve the carbon black for rubber compounding and the like.

A further object of the invention is to secure good yields of carbon black of high quality by preventing the coking which has impaired the yield and quality of a number of prior carbon blacks produced under the action of heat from an external source.

A further object of the invention is to improve the means for bringing the gas to the decomposition temperature.

Other objects and advantages of the invention will be apparent from the following description, reference being made to the accompanying drawing, in which the single figure is a side elevation through a preferred form of carbon black producing equipment.

It has long been recognized that the principal method of making carbon black, the partial combustion of hydrocarbon gases, is far from ideal. It necessarily involves burning and waste of a major portion of the gas. In addition the carbon black produced is often in gritty or coke-like form and when in such condition is not adapted for use in the compounding of rubber, printer's ink and the like.

The alternatives for partial combustion, as adopted in the prior art, are principally the direct heating of tubes through which the hydrocarbon gases to be decomposed are passed, the direct contacting of such gas with an inert gaseous medium at temperatures sufficiently high to produce carbon black, and the contacting of such gas with preheated refractory material.

I have found that by the use of a porous reaction tube through which the gases to be decomposed pass lineally and into which the heating gases diffuse laterally, the principal difficulty of direct heating is avoided. This difficulty is inherent in the fact that impervious tubes heated by combustion gases become excessively hot. Therefore, the gases are preferentially cracked or decomposed on the hot surfaces where a hard coke deposit gradually builds up. This objectionable coke formation, which reduces the direct carbon black yield, prevents further decomposition of the gas stream by its heat insulating property, and in extreme cases completely clogs the tubes, cannot adequately be prevented. Two methods purporting to accomplish this are diluting the hydrocarbon gas or sweeping it through the heating chamber with a current of inert gas. The decomposition by direct admixture of hot gas involves serious problems of heat input and handling of large volumes of gas from the reactor.

I have found that coke deposition on the tube wall is substantially prevented by the use of a porous reaction tube. This is due to the fact that the heating gas on the outside to some extent diffuses through the tube and thereby prevents the deposition of carbon on the inner wall. The required heat can easily be supplied to the hydrocarbon gas in a system of this type. The details of the operation will now be more fully described in connection with the drawing which is an elevation with parts in section.

Reference numeral 1 indicates a porous tube reaction chamber of suitable length, preferably at least two feet, pervious to gas but not to solid particles, carried by supports 2 within a heating chamber 3. The size and shape of the reaction chamber may be varied; also it may be mounted horizontally, though the vertical position shown is usually more efficient and permits easier removal of the carbon black. The porous tube is made of any suitable refractory material such as porous firebrick, porous carborundum, or the like. The degree of porosity will vary with the wall thickness, the temperature of operation, and the composition of the gas used. The heating chamber 3 is in the form of a cylindrical metallic jacket. It receives hot gases through a pipe 4 connected to a heating coil 5 in a furnace 6. A pressure control valve 7 is installed in pipe 4.

The pressure of the heating gases is maintained somewhat higher than that of the hydrocarbon gases in the tube. This pressure differential will be adjusted to correspond to the rate of diffusion for a tube of given porosity. A blower may be provided in line 4 to raise the pressure above atmospheric, but the differential is preferably obtained by installing a vacuum pump 8 in the exit line 9 from the chamber 1. If the heating gases and the hydrocarbon gases are at the same pressure, the rate of diffusion through the tube wall is ordinarily not sufficient. The heating gases may be several pounds per square inch gauge pressure above the pressure of the gases in the tube, the actual differential depending upon the conditions of operation and particularly upon the porosity of the tube wall. A pressure gage 1a and pyrometers 1b are provided on reaction chamber 1.

Any suitable source of heating gases may be used, provided they do not contain any substantial amounts of oxygen or compounds which would yield oxygen to the hydrocarbon gas. Nitrogen and carbon monoxide are suitable gases for this purpose, as are also flue gases such as are obtained from blast furnaces or other high temperature operations. The heating gas is stored in gas holder 10.

The gas to be decomposed is preferably natural gas from which the normally liquid hydrocarbons have been removed by compression and condensation, or otherwise. The gas may consist mostly of hydrocarbons containing not more than two carbon atoms in the molecule, but in general it is desirable to include the higher normally gaseous hydrocarbons ($C_2H_6$, $C_3H_8$, $C_4H_8$ and $C_4H_{10}$). Gases of these types may be obtained by treating gases from oil refineries and elsewhere as well as from natural gas sources. The gas is passed from gas holder 11 through line 12 and preheater 13 into the reaction chamber inlet pipe 14. The preheater may be advantageously installed in the convection section of furnace 6. Pipe 14 discharges into reaction chamber 1.

Referring to operation with a gas high in methane and ethane, the gas is heated in preheater 13 to a temperature of about 900–1000° C. The temperature of the heating gases passing around reaction chamber 1 is best controlled to lie between the limits of 1100–1500° C. At this temperature the hydrocarbon gases are decomposed to yield carbon in a finely divided, soft and unctuous (non-gritty) form. The carbon is an intense black. It is naturally free from oxygen, as sources of that element are excluded and it preferably contains hydrocarbon material, as will be further described.

The carbon black is swept out of the reaction tube 1 by the entering hydrocarbon gas stream and is collected in a separator 15 having baffles 15a. The exit gas may in addition be passed through a bag filter system, not shown. The separator may be provided with a discharge opening 16 and a screw conveyor 17. This can be operated to discharge the carbon black into trucks or the like 18.

The undecomposed hydrocarbon gases, together with the heating gas which diffuses through the wall of reaction tube 1, are passed from separator 15 through line 21. This gas may be put back into the supply line 12 through line 22, or the gas or part of it may be discharged from the system by line 23 and used for fuel or other purposes. The exit gas may be used as the heating medium in the process. A pressure control valve 16' is installed in line 21 and valves 19 and 20 are arranged respectively in lines 22 and 23.

For many purposes it is desirable that the carbon black contain a regulated amount of intermediate hydrocarbon decomposition products or their polymers, such for example as polymers of ethylene, benzol, naphthalene and the like. It is known that oily compounds are frequently produced in the decomposition of natural gas for the manufacture of carbon black. Heretofore this has been regarded as a detriment to the product. I have found, however, that the objection to these oily substances is not in their presence but in their uncontrolled amount. By suitable regulation of the present process it is possible to secure a product which will contain the optimum quantities of hydrocarbons, especially aromatic hydrocarbons, to facilitate the incorporation of the carbon black in rubber or for other uses.

For example, when operating according to the general conditions outlined above the product can be controlled so as to contain any desired amount of normally liquid (or solid) hydrocarbon compounds by varying the conditions, such as the temperature of the heating gas and the time of contact with the hydrocarbon gas to be decomposed. The control of temperature at the point where the carbon black is being separated from the gas stream is important. By this control the amount of polymerized hydrocarbon material in the exit gas can be regulated. When it is desired to produce a carbon black having in the neighborhood of one per cent. by weight of aromatic substances of the nature of benzol and naphthalene occluded in the pores and adsorbed on the surface of the carbon, I pass the hydrocarbon gas through the reaction tube at a temperature of about 1200° C., the time of travel of the gas through the tube being about 10 seconds. To make a carbon black free of aromatic compounds or other non-carbon bodies, the temperature should be raised to about 1400° C. and the time of contact prolonged to about 20 seconds. For a higher content of hydrocarbon compounds, say 5% by weight, the reaction temperature should be about 1150° C. and the time of travel about five seconds. It will be understood that these figures are given merely for purpose of illustration and that they will vary with the composition of the feed gas.

In general, the higher the temperature and the longer the time of contact within reasonable limits, the "drier" or more nearly carbonaceous the product will be.

It is possible also to modify the operation of the process by including in the hydrocarbon gas certain proportions of higher hydrocarbons, such as those containing 3, 4 or 5 carbon atoms in the molecule. This may be done by addition of the desired hydrocarbons to the gas or by selective removal of the hydrocarbons not desired.

In general, however, I prefer to control the process by varying the time and temperature when operating on the lower hydrocarbons. It is not usually practical to incorporate in the carbon product any aromatic or other normally liquid or solid compounds. To secure the desired properties the carbon should be precipitated from the gas at the same time that it occludes the aromatic compounds and the like.

There is, in most cases, no advantage in operating the process either under superatmospheric or sub-atmospheric pressure, except insofar as this is required to secure diffusion through the tube. However, the use of pressures higher than or lower than atmospheric are not precluded.

In the preferred form of the invention the carbon black carries from one-half to five percent by weight of intermediate decomposition products or their polymers, especially compounds of the type of polymers of ethylene, benzol, naphthalene and more complex cyclic materials of tarry nature. The presence of these normally liquid substances does not prevent the carbon from being light in weight, finely divided and non-coherent. It will be understood that they are for the most part doubtless adsorbed on the carbon as surface films of extreme tenuity.

Such carbon black is admirably adapted for use in rubber compounding due to the fact that the hydrocarbon compounds serve as wetting agents to facilitate the blending of the carbon black with the rubber. Similar advantages accrue in the use of the carbon black for the manufacture of printer's inks, pigments, and the like. The product is to be distinguished from those carbon blacks which have been heretofore described as containing oily and tarry material. Such products have been prepared by partial oxidation or excessive decomposition proceeding in part to the coke stage.

It is evident that the porous tube principle of this invention is applicable also when the diffusing gas is not used as the heating medium. Electrical or other heat sources may be used. The porous tubes may be suspended or otherwise mounted within the furnace in such manner that the furnace gases serve as the heating and diffusing medium. The combustion should be regulated so as to give a minimum oxygen content at the point of diffusion into the reaction tube.

Various changes and alternative procedures may be made within the scope of the appended claims, in which it is my intention to claim all novelty inherent in the invention as broadly as the prior art permits.

I claim:

1. A method of making carbon black, which comprises passing a hydrocarbon gas through a reaction zone surrounded by refractory material pervious to gas but impervious to solid particles, maintaining a temperature in said reaction zone sufficient to cause decomposition of the hydrocarbon gas at least partially to carbon black, maintaining a blanket of gas on the outer surface of said refractory material, adjusting the difference between the pressure of the gas blanket and the pressure of the reaction gases so as to cause gas from the gas blanket to diffuse through said refractory mass over substantially the entire surface area thereof into said reaction chamber at a sufficient speed to counteract the tendency of carbon to deposit on those surfaces of the refractory material which define the reaction zone, withdrawing the reaction gases from said reaction zone, and separating carbon black therefrom.

2. A method of making carbon black, which comprises passing a hydrocarbon gas through a reaction zone defined by a refractory material pervious to gas but impervious to solids, surrounding the exterior of said refractory material by a blanket of a non-oxidizing gas heated to a sufficient temperature to maintain in said reaction zone a temperature sufficiently high to decompose the hydrocarbon gas at least partly into carbon black, adjusting the difference between the pressure of the blanket of non-oxidizing gas and the pressure of the reaction gas to cause said non-oxidizing gas to diffuse through said refractory material over substantially the entire surface area thereof into said reaction zone at a sufficient rate to counteract the tendency of carbon to deposit on those portions of said refractory material which define the reaction zone, withdrawing the reaction gases from said reaction zone, and separating carbon black therefrom.

3. The method according to claim 2 in which the hydrocarbon gas is heated to a temperature of about 1200° C. for a time of about 10 seconds.

4. A method according to claim 2 in which the hydrocarbon gas treated is mainly composed of methane and ethane.

5. The method according to claim 2, in which the reaction is carried out at a temperature of approximately 1400° C.

PER K. FROLICH.